United States Patent Office 3,379,607
Patented Apr. 23, 1968

3,379,607
PROCESS FOR BONDING SILICONE ELASTOMERS AND PRIMER COMPOSITIONS THEREFOR
William W. Foster, Grand Island, and Daniel Pittner, West Seneca, N.Y., assignors to Union Carbide Corporation, a corporation of New York
No Drawing. Filed Oct. 21, 1963, Ser. No. 317,793
15 Claims. (Cl. 161—207)

The present invention relates in general to primer compositions for promoting the bonding of cured diorganopolysiloxane elastomers to solid substrates and to the method for firmly adhering a polysiloxane elastomer to a wide variety of substrates. More particularly the invention relates to novel primer compositions which are the reaction products of organofunctional silanes and at least one compound of the class consisting of compounds of boron and compounds of phosphorus.

Cured polysiloxane elastomers exhibit a characteristic lack of adhesiveness toward surfaces of solid materials, especially metallic surfaces. Heretofore, a variety of primer compositions have been proposed for bonding polysiloxane elastomers to solid substrates as well as a variety of techniques. The method can be generally categorized as (a) applying a primer coating to the substrate (such as an epoxy resin or dimethyldichlorosilane) which possesses a mutual affinity for the substrate and the elastomer and thereafter applying the elastomer, either cured or uncured, to the primed surface with pressure and/or heat; and (b) initially forming an intimate mixture of a polysiloxane elastomer and a compound such as methacryloxypropyltrimethoxysilane which is known to promote bonding, and applying the integral blend thus formed to the selected substrate.

The latter technique has been found, as a rule, to possess the disadvantage of inducing physical property changes in the polysiloxane elastomer which are undesirable. Moreover, for reasons not fully understood, these undesirable effects cannot in most cases be prevented by simply omitting the initial blending step and applying the bonding promoter as a separate primer material. Many compounds which promote bonding in the form of an integral blend with the elastomer do not function as such as separate primers.

With respect to the former method, i.e. (a) supra, it has been found that a number of primer compositions which are quite effective when applied to substrates under ideal conditions, have a pronounced tendency under less favorable conditions to undergo hydrolysis during application and thereby lose activity as primers.

It is therefore the general object of the present invention to provide a primer composition which produces not only an initially effective bond for polysiloxane elastomers but which also is highly resistant toward hydrolysis and is thus capable of producing permanently bonded coatings.

It is a more particular object to provide a primer composition which is especially effective to bond polysiloxane elastomers to metal substrates.

It is a still more particular object to provide a primer composition which is capable of forming firmly bonded polysiloxane elastomer coatings to polished steel surfaces and which also inhibits environmental corrosion of the metal substrate.

It is another object to provide a process for preparing articles having surfaces coated with cured polysiloxane elastomers.

These and other objects as will be obvious from the specification appearing hereinafter are accomplished in accordance with the present invention by employing a primer composition which is the polymeric reaction product of a boron-containing compound or a phosphorus-containing compound or a mixture of boron compound and a phosphorus compound with an organofunctional silane containing at least one olefinically unsaturated organic moiety attached to silicon through a carbon to silicon bond.

The silanes suitably employed as reactant to form the novel primers of this invention are represented by the general formula I 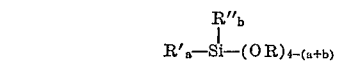

wherein R is a monovalent hydrocarbon radical free of aliphatic unsaturation; R' is a monovalent organic radical containing at least one

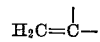

group, said R' radical being free of acetylenic unsaturation and being bonded to the silicon atom through a carbon to silicon bond; $a$ is an integer having a value of from 1 to 2 inclusive; R" is a monovalent organic radical free of aliphatic unsaturation; $b$ is an integer having a value of from 0 to 1 inclusive; with the proviso that the value of $(a+b)$ is from 1 to 2 inclusive. Preferably R and R" are straight or branched chain alkyl groups containing from 1 to about 10 carbon atoms, most preferably containing from 2 to 5 carbon atoms inclusive. R' is preferably a hydrocarbon or a radical containing only hydrogen, carbon and oxygen and containing only one

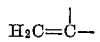

group. Most preferably R' is a vinyl group,

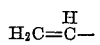

Illustrative of the groups represented by R and R" in Formula I above are methyl, ethyl, propyl, isopropyl, n-butyl, isoamyl, cyclopentyl, cyclohexyl, octyl, 2-ethylhexyl, nonyl, n-decyl, phenyl, p-methylphenyl, p-phenylphenyl, α-naphthyl, phenyl methyl and the like.

Illustrative of the groups represented by R' in Formula I above are vinyl, allyl, cyclohexenyl, cyclopentenyl, α-vinyl propylene, 2-vinylbutyl, methacryloxypropyl, and the like.

Specific silanes represented by Formula I above are
vinyltriethoxysilane,
allyl(methyl)diethoxysilane,
methacryloxypropyl(propyl)dipropoxysilane,
cyclopentenyl-tributoxysilane,
cyclohexenyltriphenoxysilane,
2-vinyl-butyl(cyclohexyl)diisopentoxysilane,
ethacryloxylethyl(ethyl)diethoxysilane,
epsilon-vinylpentyl(phenyl)dicyclohexoxysilane,
vinyl(decyl)diethoxysilane,
divinyldiethoxysilane,
diallyldipropoxysilane,
vinyl(cyclohexenyl)dibutoxysilane,
methacryloxypropyl(vinyl)dipentoxysilane,
and the like.

The boron-containing compounds suitably employed as reactants to form the novel primer compositions of this invention include all the known liquid and solid boron compounds which contain the elements boron, oxygen, hydrogen, carbon and nitrogen and which contain at least one oxygen or one hydrogen atom directly attached to boron. Typical of such compounds are the boric acids such as pyroboric acid, boric acid, and the like; the esters of the boric acids, such as trimethyl borate, triethyl borate, tri-n-propyl borate, tri-n-butyl borate, triamyl borate, tri-n-dodecyl borate, tri-hexylene glycol borate, tri(2-cyclohexylcyclohexyl) borate, tri(di-isobutylcarbinyl) borate, tristearyl borate, trioleyl borate, triphenyl borate, tri-o-cresyl borate, 2,6-di-tertiary-butyl-p-cresyl-diallyl borate, 2,6-di-tertiary-butyl-p-cresyl-di-2-ethylhexyl borate, 2,6-di-tertiary-butyl-p-cresyl-di-n-butyl borate, and the like; the anhydride of boric acid, namely, boron anhydride (boric anhydride, $B_2O_3$); the boron hydrides, such as pentaborane ($B_5H_9$), hexaborane ($B_6H_9$), decaborane ($B_{10}H_{14}$), and the like; the complexes formed by such hydrides with ammonia and other nitrogen compounds, such as triethanolamine borate, tri-isopropanolamine borate, and the complex formed between diborane and ammonia ($B_2H_6 \cdot 2NH_3$); the complexes formed by such hydrides with hydrocarbon compounds, such as diphenyldecaborane, and the like and the alkali and alkaline earth metal derivatives or complex of the boric acids, such as sodium metaborate, potassium pentaborate, magnesium borate, and the like.

The boron-containing compounds employed in preparing the primer compositions of this invention preferably contain at least one hydroxyl group attached to boron. Illustrative of such compounds are the boric acids, such as pyroboric acid, boric acid, and the like. The most suitable boron-containing compounds are those boron compounds which contain only boron, oxygen and hydrogen atoms, such as the boric acids, or those boron compounds which contain only boron, oxygen, hydrogen and carbon atoms.

The phosphorus-containing compounds suitably employed as reactants to form the novel primer composition of this invention include all the known liquid and solid phosphorus compounds which contain the elements phosphorus, oxygen, hydrogen, carbon and halogen and which contain at least one oxygen atom directly bonded to phosphorus. Typical of such compounds are the phosphoric acids such as $H_3PO_4$, meta-phosphoric acid ($HPO_3$), pyrophosphoric acid ($H_4P_2O_7$), ortho-phosphoric acid ($H_3PO_4$); the esters of phosphoric acid such as the trialkyl phosphates $(CH_3)_3PO$ and $(C_2H_5)_3PO$, dialkylarylphosphates such as $(CH_3O)_2(C_6H_5O)PO$; phosphonic acids such as alkenylphosphonic acids $$[CH_2=CHPO(OH)_2]$$

arylphosphonic acids $[C_6H_5PO(OH)_2]$; phosphonic dichlorides such as alkenyl and alkylphosphonic dichlorides $(CH_2=CHPOCl_2)$, $(CH_3POCl_2)$ and $(C_2H_5POCl_2)$; and arylphosphonic dichlorides $C_6H_5POCl_2$; dialkylalkylphosphonates $CH_3PO(OC_2H_5)$; oxyhalide compounds such as phosphorus oxybromide and phosphorus oxychloride; alkyl phosphoric acids such as $[(CH_3)_3COPO(OH)_2]$ and $[C_2H_5OPO(OH)_2]$; arylphosphoric acids such as $$C_6H_5OPO(OH)_2$$

alkylaryl phosphoric acids such as $$(C_2H_5O)(C_6H_5O)PO(OH)$$

and diaryl phosphoric° acids such as $(C_6H_5O)_2PO(OH)$, and the like.

Preferably the phosphorus compounds employed are those which contain at least one hydroxyl group attached to phosphorus, and most preferably are meta-, and pyrophosphoric acid and members of the class having the general formula:

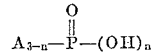

where A represents a hydrocarbyl or a hydrocarbyloxy group such as methyl, ethyl, butyl, stearyl, dodecyl, phenyl, methoxy, propoxy, pentoxy, phenoxy, and the like and $n$ has a value of from 1 to 3 inclusive.

The primer compositions of this invention are prepared by contacting at elevated temperatures one or a mixture of two or more of the above-described silane reactants with one or a mixture of two or more of the boron-containing and/or phosphorus-containing reactants in proportions within the range such that the reaction mixture contains from about 0.05 to about 10 total parts by weight elemental boron and/or phosphorus per part by weight elemental silicon with the proviso that when the boron compound and/or the phosphorus compound is free of hydroxyl groups attached to boron and phosphorus respectively, the silane compound contains at least one hydroxyl group attached to silicon, and preferably at least two such hydroxyl groups per molecule. Preferably from about 0.3 to about 3 total parts boron and/or phosphorus per part silicon by weight are employed.

Although we do not wish to be bound by any particular theory, it is believed that copolymerization of the silane and the boron and/or phosphorus compound occurs through the mechanism of a condensation reaction between at least one hydroxyl group attached either to silicon or boron or phosphorus and a corresponding hydroxyl group or hydrocarbyloxy group on the other reactant. For example, where the silane is vinyltriethoxysilane, the polymerization reaction proceeds satisfactorily, with boric acid or meta-phosphoric acid which have reactive —OH groups. Using the same silane, however, and triethyl borate or triethyl phosphate it is necessary to provide the system with sufficient water to theoretically hydrolyze at least one, and preferably at least two, of the ethoxy groups of a number of silane molecules equal to the number of boron and/or phosphorus molecules present which have no hydroxyl groups attached to boron or phosphorus. It is to be understood however, that it is immaterial whether the water produces hydroxyl groups in the silane or in the boron or phosphorus compound, the polymerization reaction being able to proceed in either event.

Moreover it can be advantageous to add water to a system of reactants having the essential hydroxyl groups where additional reactive hydroxyl groups are desired to increase the degree of polymerization.

At temperatures within the range of from about 10° C. to about 130° C. the reaction between the boron compound and the silane is spontaneous and self-sustaining in the absence of catalysts. The reaction should not be permitted to proceed so far as to produce an insoluble gel product, however, since such products are difficult to apply to a substrate surface.

The reaction can be carried out in bulk or in a solvent medium in such materials as isopropanol, trichloroethylene, ethanol, petroleum ether, and the like. Bulk reactions are preferred, however, since a bulk system permits the removal of volatile alcohol or acid by-products by such convenient and simple techniques as vacuum distillation.

The process for bonding an organosilicon elastomer to a substrate surface comprises applying the polymeric primer composition described hereinbefore as a thin coating to the desired clean surface, and allowing the coating to air-dry. Thereafter an uncured organosiloxane rubber stock containing a curing catalyst such as an organic peroxide is applied to the primer coating by means of moderate pressure and heating the stock according to conventional procedure to produce a cured elastomeric material.

Advantageously the polymeric primer material is applied to the substrate surface in the form of a relatively dilute solution of the polymer in a polar solvent such as isopropanol. Polymer concentrations in the solvent of the order of from about 1 to about 10 weight percent solids content have been found to produce highly effective thin films of primer coatings which readily air dry and which are quite resistant toward hydrolysis.

As far as is known, the primer compositions of this invention can be employed to bond organopolysiloxane elastomers to any solid substrate material. However, it has been found that when non-polar polymers, such as polytetrafluoroethylene, polyethylene, and polypropylene are employed as the materials to be bonded, that the bonds formed between such materials and the elastomers employed are not quite as strong as the bonds capable of being formed between such elastomers and other natural or synthetic materials. Among the materials which can be employed in preparing the composite articles of this invention may be mentioned metal and metal alloys, such as steel, phosphatized steel, aluminum, anodized aluminum, copper, tin, brass, bronze, gold, titanium, and the like; siliceous materials, such as glass cloth, ceramics, porcelain, and the like; organic fibers, such as wool, cotton, and the like and any of the various synthetic organic fibers, such as nylon, Dacron, and the like; cellulosic materials, such as wood, paper, cellophane, cellulose acetate, cellulose butyrate, ethyl cellulose, butyl cellulose, and the like; polymeric substances, including addition-type polymers, such as polyvinyl chloride, polyvinylidene chloride, polyvinyl acetate, polyacrylonitrile, polymeric methyl methacrylate, and the like; the various copolymers of such materials, and condensation-type polymers, such as the solid reaction products of hexamethylene diamine with dibasic acids such as adipic acid and sebacic acid, the solid reaction products of methyl terephthalate and ethylene glycol, and the polycondensation products of caprolactam, and the like.

The composite articles of this invention can exist in a wide variety of forms. Thus, the elastomers employed in this invention can be bonded to various natural or synthetic materials in the shape of slabs, rods, films, sheets, strips, and matted fibers, to produce a wide variety of articles such as ducts, gaskets, tapes, diaphragms, conveyor belts, and the like.

One form which the composite articles of this invention can take is that of a laminate in which plies of natural or synthetic materials are bonded to plies of organopolysiloxane elastomers. These laminated articles can be comprised of a multiplicity of plies of like or unlike natural or synthetic materials held together by a multiplicity of plies of organopolysiloxane elastomer, or they can be comprised of a single ply of a natural or synthetic material bonded to a single ply of elastomer. Such laminates can also comprise a composite of two plies of like or unlike natural or synthetic materials bonded together by a single ply of elastomer, or they can be comprised of two plies of elastomer coated on an intermediate ply of natural or synthetic material. When the elastomer forms an outer ply of such laminates, the free elastomer surface thereof can be caused to adhere to other materials, and additional plies of natural or synthetic materials can be bonded thereto. By continually adhering alternate plies of elastomer and other materials, laminates of any desired size and thickness can be produced. Such laminates can then be cut into any desired shape and employed as gaskets, tapes, diaphragms, conveyor belts, and in various other applications.

Another form which the composite articles of this invention can take is that of elastomer-coated articles, such as elastomer-coated transformers, electrical cables, and the like, whenever it is desirable to electrically or thermally insulate such articles. As the elastomers employed in this invention are resistant to cold and heat and deterioration by the elements, they can be suitably employed in composite articles comprising a metallic window frame, or like object, in combination with weather stripping composed of such elastomers. Such elastomers are also useful in preparing composite articles wherein vacuum-tight and pressure-tight seals are important, for example, in the manufacture of electrical discharge devices where they can be employed in sealing the casings containing the anodes and cathodes.

The polysiloxane gums employed in preparing the organopolysiloxane elastomers which form the bonded coatings in the practice of this invention are diorgano-substituted polysiloxanes containing hydrocarbon groups of one or more types. Such polysiloxanes (diorganopolysiloxane gums) can contain one or more types of substituents taken from the class of hydrogen atoms, hydrocarbon groups free of aliphatic unsaturation, olefinically-unsaturated hydrocarbon groups, halo-substituted hydrocarbon groups and cyanoalkyl groups. Preferably, the organo substituents of such polysiloxanes are composed of either (a) hydrocarbon groups of one or more types that are free of aliphatic unsaturation; (b) hydrocarbon groups of one or more types that are free of aliphatic unsaturation and olefinically-unsaturated hydrocarbon groups of one or more types; (c) hydrocarbon groups of one or more types that are free of aliphatic unsaturation and halo-substituted hydrocarbon groups of one or more types; or (d) hydrocarbon groups of one or more types that are free of aliphatic unsaturation and cyanoalkyl groups of one or more types.

Preferably, when hydrocarbon groups free of aliphatic unsaturation are present in such polysiloxanes, they are selected from the class consisting of methyl, ethyl, amyl and phenyl groups; the olefinically-unsaturated hydrocarbon groups, when present, are selected from the class consisting of vinyl, allyl and cyclohexenyl groups; the halo-substituted hydrocarbon groups, when present, are selected from the class consisting of chloro- and fluoro-substituted methyl, propyl, butyl and phenyl groups, including polychloro- and polyfluoro-substituted methyl, propyl, butyl and phenyl groups; and the cyanoalkyl groups, when present, are selected from the class consisting of beta-cyanoethyl, gamma-cyanopropyl and delta-cyanobutyl groups.

The diorgano-substituted polysiloxane gums employed in preparing the polysiloxane elastomers employed in forming coated articles according to this invention can be employed entirely as linear diorganopolysiloxane gums, or as linear diorganopolysiloxane gums modified with lower molecular weight polysiloxane oils. The linear polysiloxane gums can be employed as relatively short chain, low molecular weight polysiloxanes of such viscosity that the gums remain pourable liquids, or they can be employed as relatively long chain, high molecular weight polysiloxanes of such viscosity that the gum approached the solid state and will barely flow when unconfined.

These diorganopolysiloxane gums can be prepared by conventional methods, for example, by the equilibration or coequilibration of one or more cyclic or linear diorganopolysiloxanes or by the hydrolysis of one or more hydrolyzable diorganosilane monomers.

The polysiloxane gums which can be employed as one of the components in forming the coated articles of this invention are preferably produced under conditions so controlled as to avoid (1) the incorporation therein of any significant amounts of trifunctional compounds, groups, or molecules to avoid crosslinking or linear or cyclic polysiloxane chains through silicon and oxygen atoms and (2) the incorporation therein of any significant amounts of monofunctional compounds, groups or molecules other than those specifically provided to serve as endblockers for limiting the degree of polymerization. Accordingly, my starting polysiloxane gums contain organo-pendant groups and silicon atoms in the ratio of 2.0 organo groups per silicon atom (approximately). Deviation from a ratio of 2 in any instance, for example, ratios from about 1.96 to about 2.05, with respect to the preferred practice will be insignificant for all practical purposes since it will be attributable to the presence of endblocking groups whose total numbers will be insignificant as compared with the total numbers of organo groups attached to the silicon atoms of the polysiloxane chains.

The linear diorganopolysiloxane gums employed in preparing the elastomers of this invention can be employed either alone or as a blend of two or more different gums. By suitably selecting and blending polysiloxane gums having differing organic substituents it is possible to achieve the effect of utilizing a single polysiloxane having two or more types of organic substituents. Blending can be effected in any suitable manner. For example, blending can be effected on or in rubber stock compounding rolls and mixers, either prior to or during the mixing and compounding of the other ingredients of the organopolysiloxane formulations employed in preparing the elastomers useful in this invention. Blending can also be effected through the use of solutions or dispersions of the ingredients to be mixed. When the linear diorgano-substituted polysiloxane gums employed in preparing the elastomers useful in this invention are modified with lower molecular weight polysiloxane oils, blending of the gums and oils can be effected in the manner described above, or in any other suitable manner.

The lower molecular weight polysiloxane oils used to modify such gums can be prepared by known hydrolysis methods. Thus, for example, dihydrocarbon-substituted polysiloxane oils can be prepared by the hydrolysis or cohydrolysis of one or more dihydrocarbon-substituted dihalo- or dialkoxysilanes in which the hydrocarbon groups attached to silicon can be the same or different.

When olefinically-unsaturated hydrocarbon groups are present in the linear polysiloxane gums employed in preparing the elastomers of this invention, they are preferably present in limited predetermined numbers, and are disposed at spaced intervals along the linear polysiloxane chains. Thus, when such gums consist of dihydrocarbon-substituted polysiloxanes having substituents composed of hydrocarbon groups free of aliphatic unsaturation and olefinically-unsaturated hydrocarbon groups, it is preferred that from 0.037 to 0.70 percent of the silicon atoms disposed along the linear polysiloxane chains be bonded to olefinically-unsaturated hydrocarbon groups (equivalent to about 0.05 to 1.0 percent by weight of olefinically-unsaturated hydrocarbon groups). In like manner, when such gums contain organo substituents in addition to hydrocarbon groups free of aliphatic unsaturation and olefinically unsaturated hydrocarbon groups as, for example, halo-substituted hydrocarbon groups and/ or cyanoalkyl groups, it is again preferred that from 0.037 to 0.70 percent of the silicon atoms present be bonded to olefinically-unsaturated hydrocarbon substituents. The introduction of such number of olefinically-unsaturated hydrocarbon groups into the polysiloxane contemplates the provision of from five to twenty cross-links per molecule such groups upon curing, but such groups can be present in greater or lesser amounts to provide cured elastomers of modified properties.

Oftentimes, it may be desirable to effect cross-linking of such polysiloxane gums through groups in addition to or in place of olefinically-unsaturated hydrocarbon groups. Such can be accomplished by the use of curing agents which do not exhibit a tendency to selectively and preferentially effect cross-linking through olefinically-unsaturated hydrocarbon groups. Catalysts suitable for use in curing organopolysiloxane gums to elastomers useful in this invention are hereinafter more fully described.

When the linear polysiloxane gums employed in preparing the elastomers of this invention consist of organo-substituted polysiloxanes having organo substituents composed of hydrocarbon groups and halo-substituted hydrocarbon groups, it is preferred that such gums contain an average of from about 0.1 to about 1, preferably from about 0.25 to about 0.75, halo-substituted hydrocarbon groups per silicon atom. When such gums consist of organo-substitute dpolysiloxanes having organo substituents composed of hydrocarbon groups and cyanoalkyl groups, it is preferred that such gums contain an average of from about 0.1 to about 1, preferably from about 0.25 to about 0.75, cyanoalkyl groups per silicon atom.

Polysiloxane elastomers employed in this invention can be cured by conventional curing procedures. Thus, the polysiloxane compounds can be cured to an elastomer by heating the compound in a mold at temperatures of about 250° F. or higher for periods of time of fifteen minutes or longer with the aid of any of the conventional curing catalysts.

The curing of a starting organopolysiloxane gum involves the production of crosslinks between the molecules of the gum. Silicon-bonded monovalent olefinically unsaturated hydrocarbon groups react to produce such cross-links between the molecules of the organopolysiloxane gum. The relative amount of monovalent olefinically unsaturated hydrocarbon groups contained in the gum is that amount which provides the degree of crosslinking necessary to impart elastomeric properties to the cured product. The cured products produced from gums that are crosslinked by an insufficient amount of monovalent olefinically unsaturated hydrocarbon groups are soft and gummy rather than elastomeric. The cured products produced from gums that are crosslinked by an excessive amount of monovalent olefinically unsaturated hydrocarbon groups are hard and brittle rather than elastomeric. Generally, amounts of such groups from 0.05 part to 3.0 parts by weight per 100 parts by weight of the siloxane groups in the gum usually provide the degree of crosslinking necessary to produce an elastomeric product. Preferably, the starting gum contains from 0.2 part to 0.4 part by weight of such groups per 100 parts by weight of the siloxane groups in the gum. Conversely, in this instance, the gum may contain from 97.0 parts to 99.95 parts by weight but preferably contains from 99.6 prats to 99.8 parts by weight of siloxane groups.

The presence of silicon-bonded monovalent olefinically unsaturated hydrocarbon groups in the starting gum is not essential since other silicon-bonded groups (e.g., silicon-bonded alkyl groups) can react to produce cross-links between the molecules of the starting gum.

In producing the stabilized silicone elastomers of this invention, curable gum compounds containing organopolysiloxane gums and zeolitic molecular sieves retaining organic antioxidants may be cured by various processes. Suitable processes include those that employ ozone, azo compounds, electronic beams, heat alone, sulfur and heat in conjunction with an organic peroxide curing agent. The curing process that is preferred in producing the stabilized silicon elastomer of this invention includes mixing an organic peroxide curing agent along with a curable gum compound containing organopolysiloxane gum to produce a mixture that is cured by heating.

Organic peroxides are useful in this invention as curing agents. Included among such organic peroxides are alkyl peroxides, acyl peroxides, and alkyl-acyl peroxides. Useful alkyl peroxide curing agents are the dialkyl peroxides such as di(tert-butyl) peroxide and dicumyl peroxide. Useful acyl peroxide curing agents are the diacyl peroxides (such as benzoyl peroxide, p-chlorobenzoyl peroxide and 2,4-dichlorobenzoyl peroxide) and per acids or peroxy acids (such as peracetic acid and perbenzoic acid). Useful alkyl-acyl peroxide curing agents may be illustrated by such compounds as tert-butyl perbenzoate and tert-butyl peracetate.

The type of organic substituent that is involved in the reaction that produces crosslinking during the cure of the starting gum determines to some extent which of the above-mentioned organic peroxide curing agents is most advantageously employed. Thus di(tert-butyl) peroxide is the preferred curing agent when the starting gum is cured by the reaction of silicon-bonded vinyl groups. Benzoyl peroxide is the preferred curring agent when the starting gum is cured by the reaction of silicon-bonded alkyl groups.

The amount of the organic peroxide used as a curing agent is not narrowly critical. In practice the amount of the curing agent may vary from 0.1 part by weight to 4 parts by weight of the peroxide per 100 parts by weight of the organopolysiloxane gum. When organopolysiloxane gums that cure through alkenyl groups are employed, the preferred amount of the peroxide curing agent is from 0.5 part to 1.0 part by weight per 100 parts by weight of the gum. When organopolysiloxane gums that cure through other groups are employed, the preferred amount of the peroxide curing agent is from 1.5 parts to 2.5 parts by weight per 100 parts by weight of the gum. Greater or lesser amounts of the peroxides may be used but no commensurate advantage is gained thereby.

The curable gum compounds used in this invention usually contain a filler. The fillers that are useful in this invention include acidic fillers (such as uncoated finely divided silica), basic fillers (such as carbon black and alumina) and neutral fillers (such as diatomaceous earth, coated finely divided silica, calcium carbonate and quartz). These fillers impart desirable physical properties (e.g. high tensile strength) to silicone elastomers.

The effectiveness of some of the peroxide curing agents that may be used in this invention is impaired by certain fillers. By way of illustration, the effectiveness of benzoyl peroxide curing agents is impaired by carbonaceous fillers (such as carbon black) and so such fillers are not employed when benzoyl peroxide is used as a curing agent. As a further illustration, the effectiveness of dicumyl peroxide as a curing agent is impaired when it is used in curable gum compounds containing silica (or other acidic fillers) as the sole filler. Hence, when dicumyl peroxide is employed as a curing agent neutral fillers, basic fillers or mixtures of acidic fillers and neutral or basic fillers are used.

The amount of the filler that may be used may range in general from 25 parts to 65 parts by weight of the filler per 100 parts by weight of the organopolysiloxane gum. Preferably from 35 parts to 45 parts by weight of the filler per 100 parts by weight of the gum are employed.

The present invention is exemplified by the following examples which are illustrative of the novel primers and process of the invention and are not intended to be in any way limitative thereof.

Example 1

To an open glass reactor were charged 31 grams (0.125 mole) methacryloxypropyltrimethoxy silane and 6 grams (0.097 mole) boric acid ($H_3BO_3$). The mixture thus formed was heated at a temperature of about 265° F. for a period of about 30 min. The reaction product, which was a viscous polymeric liquid, was diluted with approximately 60 ml. trichloroethylene and brushed on the surface of a 1" x 6" strip of steel which had just previously been cleaned by sand-blasting. The solvent medium was permitted to evaporate for a period of ten minutes leaving a dry coating of the polymeric primer. To the primed surface thus prepared was thereafter applied an uncured sheet of rubber stock consisting of about 100 parts by weight of a dimethyl-methylvinyl polysiloxane gum, about 125 parts by weight of silica filler, about 20 parts by weight of an alkoxy endblocked dimethylsilicon fluid, and about 1.3 parts by weight of dichlorobenzoyl peroxide. The rubber stock sheet was pressed against the primed surface of the metal strip in a mold and heated at 240° C. for 15 minutes to cure the stock and accomplish a firmly bonded laminate. The bond between the cured elastomer coating and the primed steel surface was found to be stronger than the elastomer itself, i.e., the elastomer coating was ruptured before it could be pulled free from the substrate.

Example 2

(A) To an open glass reactor were charged 50 grams (0.263 mole) vinyltriethoxysilane and 10.4 grams (0.168 mole) boric acid ($H_3BO_3$). The mixture thus formed was heated to about 240° F. for a period of 20 minutes. At the end of this period a very viscous polymeric reaction product had been formed which was thereafter diluted with trichloroethylene to obtain a primer solution having a solids content of about 10 percent by weight. The primer composition was applied to a clean polished steel substrate, and an uncured sheet of rubber stock was cured in situ thereon in accordance with the procedure and formulation of Example 1. A good bond between elastomer coating and the steel substrate was obtained. When the test panel was postcured at 450° F. for 16 hours and immersed in a light petroleum oil containing reactive sulfur-containing additives for 48 hours at 300° F., the adherence of the coating was found to be substantially unaffected, and the substrate was free of sulfur induced corrosion.

(B) Similar results are obtained when the primer composition applied to the substrate is any of a 1, 2, 4 or 8 weight percent solution of the primer of part (A) in trichloroethylene.

Example 3

A mixture consisting of 108.5 grams vinyltriethoxysilane and 52.2 grams phenyl boric acid ($C_6H_5B(OH)_2$) was heated at a temperature of about 200 to 240° F. with stirring for a period of about 60 minutes. During the reaction period 28 grams of ethanol were removed from the reaction mixture by distillation, leaving a viscous cloudy polymeric reaction product. From this product a 10 percent by weight solution in isopropanol was prepared and applied to a grit-free sand blasted mild steel surface. The primed metal surface was air dried for five minutes at 120° F. and a uniform sheet of the uncured elastomer material of Example 1 was applied thereto by pressure in a mold for a 15 minute period at 250° F. A bond stronger than the cured elastomeric coating was obtained.

Example 4

(A) A polymeric reaction product of phosphoric acid and vinyltriethoxysilane was prepared by adding drop-wise 57.7 grams of an 85 percent aqueous solution of $H_3PO_4$ to 190 grams of vinyltriethoxysilane while maintaining the reaction temperature within the range of 10 to 15° C. The resulting product was allowed to warm to ambient room temperature and was diluted with dry isopropanol to form a 10 percent by weight solids solution. When this solution was applied as a primer coating to a polished steel surface, and coated with the same uncured elastomer material as in Example 1, a good bond was obtained after mold curing and after post-curing.

(B) Equal weight proportions of the primer composition of part (A) and the primer composition of Example 2 were admixed and employed as a primer for an elastomer coating using the formulation and procedure set forth in Example 3. The resulting bond between the elastomer and the substrate was found to be stronger than the elastomer itself, both mold cured and post-cured. When the test panel was post-cured at 450° F. for 16 hours and immersed in a light hydrocarbon oil containing reactive sulfur-containing additives for 50 hours at 300° F. the adherence of the coating was found to be substantially unaffected and the substrate was free of sulfur induced corrosion.

Example 5

(A) To 332.5 grams (1.75 moles) of vinyltriethoxysilane in a glass reactor were added drop-wise with stirring 14.4 grams (0.125 mole) $H_3PO_4$ (as an 85 percent aqueous solution). The reactor was heated to about 80° C. and 18 grams of ethanol was removed by distillation. To the contents of the reactor was thereafter added 30.9 grams (0.5 mole) $H_3BO_3$ and stirring continued until an additional 70 grams ethanol had been removed by distillation. The product in the reactor was a water-white low viscosity liquid copolymer.

(B) A 10 percent by weight solution of the copolymer of part (A) in isopropanol was applied to a clean mild steel surface, air dried, and then heat set for 5 minutes at 120° F. Over the primed surface thus formed was applied a sheet of the silicone elastomer described in Example 1. Bonding of the elastomer to the primed substrate was accomplished by pressing in a mold for 15 minutes at 250° F. The elastomer coating was thereafter post-cured at 480° F. for 12 hours. The resulting bond between the elastomer and substrate was found to be much stronger than the elastomer itself.

Example 6

A number of different metal substrates were primed and coated with an elastomer according to the following procedure and formulation:

(a) Primer composition—a 10 percent by weight solution in trichloroethylene of the polymeric reaction product of 1.05 moles vinyltriethoxysilane and 0.65 mole boric acid wherein reaction was continued until 1.91 moles ethanol had been evolved as by-product.

(b) Silicone elastomer—a heat-curable organopolysiloxane rubber stock consisting of 100 parts by weight of a diphenyldimethyl-methylvinylpolysiloxane gum terpolymer, 40 parts by weight of an inert silica filler, 15 parts by weight of an alkoxy end-blocked dimethylsilicone fluid, and about 1.5 parts by weight of 2,5-dimethyl-2,5-t-butoxyperoxyhexane.

The primer was applied to the various substrates shown in Table I below, air dried, and heat set for 5 minutes at 120° F. A 100 mil sheet of the silicone elastomer coating was applied to the primed surface by heating in a pressure mold for 20 minutes at 340° F.

Table I

| Substrate: | Bond Strength (lb./in. width)[1] |
|---|---|
| Steel [2] | [4] >30 |
| Stainless Steel [2] | [4] >32 |
| Brass [2] | 22.5 |
| Aluminum [2] | 21.5 |
| Copper [3] | [4] >25 |
| Gold [3] | 21 |
| Zinc [3] | 20 |

[1] Determined by measuring the force in pounds necessary to pull the elastomer coating from the substrate at an angle of 90° and at a rate of 20 inches/minute.
[2] Surfaces cleaned with trichloroethylene.
[3] Surfaces cleaned successively with trichloroethylene, 5% aqueous HCl, water, and acetone.
[4] Bond strength between elastomer coating and primed substrate was stronger than the elastomer itself, i.e. the elastomer failed at the force shown.

What is claimed is:

1. As a primer material suitable for bonding a silicon elastomer to a substrate, the polymer product obtained by contacting (A) at least one phosphorus containing compound having at least one oxygen atom directly bonded to phosphorus and devoid of any hydrogen atom directly attached to phosphorus with (B) at least one silane of the general formula:

$$R_a'-\underset{\underset{R_b''}{|}}{Si}-(OR)_{4-(a+b)}$$

wherein R is a monovalent hydrocarbon radical free of aliphatic unsaturation; R' is a monovalent radical containing at least one $CH_2=C$ group and containing only hydrogen, carbon and oxygen or hydrogen and carbon; said R' being free of acetylenic unsaturation and being bonded to the silicon atom through a carbon to silicon bond; $a$ is an integer having a value of 0 to 1 inclusive; R'' is a monovalent radical free of aliphatic unsaturation; $b$ is an integer having a value of from 0 to 1 inclusive; with the further proviso that when the phosphorus compound of (A) is free of hydroxyl groups attached to phosphorus there is at least a sufficient amount of water present in the system to hydrolyze at least one —OR group on the silane compound of (B).

2. A primer material as defined in claim 1, in which the polymer product has been dissolved in a polar solvent.

3. The primer material of claim 1 wherein the component (A) is a phosphorus compound of the formula $$A_{3-n}\overset{O}{\underset{||}{P}}-(OH)_n$$

wherein A is a member selected from the group consisting of monovalent hydrocarbyl and hydrocarbyloxy groups and $n$ is an integer having a value of from 1 to 3 inclusive.

4. The primer material of claim 1 wherein the phosphorus compound is $H_3PO_4$.

5. The primer material of claim 1 wherein the radical represented by R' in the silane of component (B) is vinyl and $a$ has a value of 1.

6. As an article of manufacture a substrate surface having as a primer coating thereon the primer material of claim 1.

7. In a process for preparing a silicon elastomer coated substrate, said coating being bonded to the substrate through a primer material, the improvement which comprises employing a primer material consisting of the polymeric product obtained by contacting (A) at least one compound selected from the group consisting of boron containing compounds which contain at least one atom selected from the group consisting of oxygen and hydrogen directly bonded to boron, and phosphorus containing compounds having at least one oxygen atom directly attached to phosphorus and devoid of any hydrogen atom directly attached to phosphorus with (B) at least one silane of the general formula:

$$R_a'-\underset{\underset{R_b''}{|}}{Si}-(OR)_{4-(a+b)}$$

wherein R is a monovalent hydrocarbon radical free of aliphatic unsaturation; R' is a monovalent radical containing at least one $CH_2=C$ group and containing only hydrogen, carbon and oxygen or hydrogen and carbon; said R' being free of acetylenic unsaturation and being bonded to the silicon atom through a carbon to silicon bond; $a$ is an integer having a value of 0 to 1 inclusive; R'' is a monovalent radical free of aliphatic unsaturation; $b$ is an integer having a value of from 0 to 1 inclusive; with the further proviso that when the boron or phosphorus compound of (A) is free of hydroxyl groups directly attached to boron and phosphorus respectively, there is at least a sufficient amount of water present in the system to hydrolyze at least one —OR group on the silane compound (B).

8. The process as defined in claim 7 wherein the compound of (A) is a boron containing compound.

9. The process as defined in claim 8 wherein the boron compound is $H_3BO_3$ and the silane is vinyltriethoxysilane.

10. The process as defined in claim 7, wherein the compound of (A) is a phosphorus containing compound of the formula:

$$A_{3-n}\overset{O}{\underset{||}{P}}-(OH)_n$$

wherein A is a member selected from the group consisting of monovalent hydrocarbyl and hydrocarbyloxy groups and $n$ is an integer having a value of from 1 to 3 inclusive.

11. The process as defined in claim 10 wherein the phosphorus compound is $H_3PO_4$.

12. The process as defined in claim 7 wherein the radical represented by R' in the silane of component (B) is vinyl and $a$ has a value of 1.

13. The process as defined in claim 7 wherein the substrate is a metal.

14. An article of manufacture comprising a substrate having coated thereon a cured silicon elastomer polymer, said coating being bonded to said substrate through the primer material as defined in claim 7.

15. An article of manufacture as defined in claim 14 wherein the substrate is a metal.

References Cited

UNITED STATES PATENTS

| 2,963,503 | 12/1960 | Marsden | 260—46 |
| 3,122,581 | 2/1964 | Pike | 260—448.2 |
| 3,164,622 | 1/1965 | Newlands | 260—448.2 |
| 2,371,068 | 3/1945 | Rochow | 260—448.2 X |
| 2,830,967 | 4/1958 | Nitzsche et al. | 260—46.5 |
| 2,843,615 | 6/1958 | Linville | 260—46.5 X |
| 2,851,439 | 9/1958 | Clark | 260—46.5 |
| 3,022,196 | 2/1962 | Jenkins et al. | 156—329 X |
| 3,047,535 | 7/1962 | Evans et al. | 260—46.5 |
| 3,108,898 | 10/1963 | Nitzsche et al. | 156—329 X |
| 3,146,799 | 9/1964 | Fekete | 156—329 X |

EARL M. BERGERT, *Primary Examiner.*

J. P. MELOCHE, *Assistant Examiner.*